(12) United States Patent
McGinley et al.

(10) Patent No.: US 7,369,297 B2
(45) Date of Patent: *May 6, 2008

(54) MIRROR STRUCTURE WITH SINGLE CRYSTAL SILICON CROSS-MEMBER

(75) Inventors: Brian K. McGinley, Saratoga, CA (US); Jonathan D. Mohn, Saratoga, CA (US); Howard Woo, San Jose, CA (US)

(73) Assignee: Miradia Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/299,140

(22) Filed: Dec. 8, 2005

(65) Prior Publication Data

US 2006/0087717 A1    Apr. 27, 2006

Related U.S. Application Data

(63) Continuation of application No. 10/871,150, filed on Jun. 18, 2004, now Pat. No. 7,042,619.

(51) Int. Cl.
G02B 26/00    (2006.01)

(52) U.S. Cl. ..................... 359/291; 359/292

(58) Field of Classification Search ............... 359/290, 359/291, 292, 295, 298, 222, 223
See application file for complete search history.

(56) References Cited

U.S. PATENT DOCUMENTS

| | | | |
|---|---|---|---|
| 4,229,732 A | 10/1980 | Hartstein et al. | |
| 4,317,611 A | 3/1982 | Petersen | |
| 4,566,935 A | 1/1986 | Hornbeck | |
| 4,615,595 A | 10/1986 | Hornbeck | |
| 5,061,049 A | 10/1991 | Hornbeck | |
| 5,172,262 A | 12/1992 | Hornbeck | |
| 5,311,360 A | 5/1994 | Bloom et al. | |
| 5,382,961 A | 1/1995 | Gale, Jr. | |
| 5,448,314 A | 9/1995 | Heimbuch et al. | |
| 5,452,024 A | 9/1995 | Sampsell | |
| 5,489,952 A | 2/1996 | Gove et al. | |
| 5,504,614 A | 4/1996 | Webb et al. | |
| 5,535,047 A | 7/1996 | Hornbeck | |

(Continued)

FOREIGN PATENT DOCUMENTS

EP    1237032 A2    9/2002

OTHER PUBLICATIONS

Henley et al., "A New SOI Manufacturing Technology Using Atomic layer Cleaving." Silicon Genesis Corporation Campbell CA. pp. 1-5.

(Continued)

Primary Examiner—Scott J. Sugarman
Assistant Examiner—Tuyen Tra
(74) Attorney, Agent, or Firm—Townsend and Townsend and Crew LLP

(57) ABSTRACT

Hydrogen cleave silicon process for light modulating mirror structure using single crystal silicon as the base cross-member. Existing processes use two critical alignment steps that can contribute to higher actuation voltages and result in lower manufacturing yields. The hydrogen cleave process simplifies the manufacturing process to one step: transferring a thin film of single crystal silicon to the CMOS substrate, resulting in minimal alignment error and providing large bonding area.

33 Claims, 14 Drawing Sheets

U.S. PATENT DOCUMENTS

| | | | |
|---|---|---|---|
| 5,583,688 A | 12/1996 | Hornbeck | |
| 5,589,852 A | 12/1996 | Thompson et al. | |
| 5,600,383 A | 2/1997 | Hornbeck | |
| 5,661,591 A | 8/1997 | Lin et al. | |
| 5,663,749 A | 9/1997 | Farns et al. | |
| 5,742,419 A | 4/1998 | Dickensheets et al. | |
| 5,757,536 A | 5/1998 | Ricco et al. | |
| 5,793,519 A | 8/1998 | Furlani et al. | |
| 5,835,256 A | 11/1998 | Huibers | |
| 5,885,468 A | 3/1999 | Kozlowski | |
| 5,939,171 A | 8/1999 | Biebl | |
| 5,999,306 A | 12/1999 | Atobe et al. | |
| 6,038,056 A | 3/2000 | Florence et al. | |
| 6,046,840 A | 4/2000 | Huibers | |
| 6,049,317 A | 4/2000 | Thompson et al. | |
| 6,127,756 A | 10/2000 | Iwaki et al. | |
| 6,172,797 B1 | 1/2001 | Huibers | |
| 6,201,521 B1 | 3/2001 | Doherty | |
| 6,252,277 B1 | 6/2001 | Chan et al. | |
| 6,285,490 B1 | 9/2001 | Meier et al. | |
| 6,323,982 B1 | 11/2001 | Hornbeck | |
| 6,337,760 B1 | 1/2002 | Huibers et al. | |
| 6,356,378 B1 | 3/2002 | Huibers | |
| 6,388,661 B1 | 5/2002 | Richards | |
| 6,396,619 B1 | 5/2002 | Huibers et al. | |
| 6,429,033 B1 | 8/2002 | Gee et al. | |
| 6,487,001 B2 * | 11/2002 | Greywall | 359/292 |
| 6,529,310 B1 | 3/2003 | Huibers et al. | |
| 6,538,800 B2 | 3/2003 | Huibers | |
| 6,542,653 B2 | 4/2003 | Wu et al. | |
| 6,543,286 B2 | 4/2003 | Garverick et al. | |
| 6,650,461 B2 * | 11/2003 | Atobe et al. | 359/291 |
| 6,809,852 B2 | 10/2004 | Tao et al. | |
| 6,820,988 B2 * | 11/2004 | van Drieenhuizen et al. | 359/872 |
| 6,827,866 B1 | 12/2004 | Novotny | |
| 6,856,068 B2 | 2/2005 | Miller et al. | |
| 6,891,654 B2 | 5/2005 | Kurosawa et al. | |
| 6,891,655 B2 | 5/2005 | Grebinski et al. | |
| 6,960,305 B2 | 11/2005 | Doan et al. | |
| 7,022,249 B2 * | 4/2006 | Valette | 216/24 |
| 7,042,619 B1 * | 5/2006 | McGinley et al. | 359/290 |
| 7,079,301 B2 * | 7/2006 | Monroe et al. | 359/290 |
| 2002/0041455 A1 | 4/2002 | Sawada et al. | |
| 2002/0071166 A1 | 6/2002 | Jin et al. | |
| 2002/0071169 A1 | 6/2002 | Bowers et al. | |
| 2002/0132389 A1 | 9/2002 | Patel et al. | |
| 2003/0117686 A1 | 6/2003 | DiCarlo | |
| 2003/0207487 A1 | 11/2003 | Kubena et al. | |
| 2004/0000696 A1 | 1/2004 | Ma et al. | |
| 2004/0004753 A1 | 1/2004 | Pan | |
| 2004/0008402 A1 | 1/2004 | Patel et al. | |
| 2004/0125347 A1 | 7/2004 | Patel et al. | |
| 2004/0136044 A1 | 7/2004 | Miller et al. | |
| 2004/0184133 A1 | 9/2004 | Su et al. | |
| 2004/0190817 A1 | 9/2004 | Aubuchon | |
| 2005/0041277 A1 | 2/2005 | Huibers | |

OTHER PUBLICATIONS

Petersen, K.E., Micromechanical Light Modulator Array Fabricated On Silicon. Applied Physics Letters. Oct. 15, 1977, pp. 521-523, vol. 31 No. 8.

Petersen, K.E., Micromechanical Membrane Switches On Silicon. IBM J. Res. Develop., Jul. 1979, pp. 376-385. vol. 23, No. 4.

* cited by examiner

MIRROR STRUCTURE WITH SINGLE CRYSTAL SILICON CROSS-MEMBER

CROSS-REFERENCES TO RELATED APPLICATIONS

This application is a continuation of U.S. application Ser. No. 10/871,150, filed Jun. 18, 2004, now U.S. Pat. No. 7,042,619 entitled "Mirror Structure with Single Crystal Silicon Cross-Member," the disclosure of which is incorporated herein by reference in its entirety.

BACKGROUND OF THE INVENTION

1. Field of the Invention

This invention relates to spatial light modulators (SLMs), and more particularly to a micro mirror structure with hidden cross-members to maximize pixel fill ratio, minimize scattering and diffraction, and achieve a high contrast ratio and high image quality.

2. Background

Spatial light modulators (SLMs) have numerous applications in the areas of optical information processing, projection displays, video and graphics monitors, televisions, and electrophotographic printing. Reflective SLMs are devices that modulate incident light in a spatial pattern to reflect an image corresponding to an electrical or optical input. The incident light may be modulated in phase, intensity, polarization, or deflection direction. A reflective SLM is typically comprised of an area or two dimensional array of addressable picture elements (pixels) capable of reflecting incident light. A key parameter of SLMs, especially in display applications, is the ratio of the optically active area to the pixel area, also called the "fill ratio." A high fill ratio is desirable.

Prior art SLMs have various drawbacks. The drawbacks include, but are not limited to: (1) a lower than optimal optically active area that reduces optical efficiency; (2) diffraction and scattering that lowers the contrast ratio of the display; (3) reliance upon materials that have long-term reliability problems; and (4) complex manufacturing processes that increase the expense of the device and lower the yield of devices from a wafer.

Many prior art devices include substantial non-reflective areas on their surfaces. This provides low fill ratios, and provides lower than optimum reflective efficiency. For example, U.S. Pat. No. 4,229,732 discloses MOSFET devices that are formed on the surface of a device in addition to mirrors. These MOSFET devices take up surface area, reducing the fraction of the device area that is optically active and reducing reflective efficiency. The MOSFET devices on the surface of the device also diffract incident light, which lowers the contrast ratio of the display. Further, intense light striking exposed MOSFET devices interfere with the proper operation of the devices, both by charging the MOSFET devices and overheating the circuitry.

Similarly, many devices include walls or frames that surround each micro mirror and separate adjacent mirrors, as shown in FIG. 3A. These walls may be used to support the mirror cross-member, and often extend to a height coplanar with the micro mirror. The presence of the walls limit mirror size and thus limit the fill ratio possible using such designs.

Some SLM designs have rough surfaces that scatter incident light and an aluminum film deposited on an low-pressure chemical vapor deposition (LPCVD) silicon nitride layer. It is difficult to control the smoothness of these reflective mirror surfaces as they are deposited with thin films. Thus, the final product has rough surfaces, which reduce the reflective efficiency.

Another problem that reduces reflective efficiency with some SLM designs, particularly in some top hanging mirror designs, is large exposed cross-member surface areas. These exposed cross-member surface areas result in scattering and diffraction due to the cross-member structure, which negatively impacts contrast ratio, among other parameters.

Many conventional SLMs, such as the SLM disclosed in U.S. Pat. No. 4,566,935, have cross-members made of aluminum alloy. Aluminum, as well as other metals, is susceptible to fatigue and plastic deformation, which can lead to long-term reliability problems. Also, aluminum is susceptible to cell "memory," which means that the rest position begins to tilt towards its most frequently occupied position.

Other conventional SLMs require multiple layers and processing steps. Manufacturing such a multi-layer SLM requires use of repetitive multi-layer thin film stacking, etching, and other processes that increase the expense and complexity of manufacturing the device. Often, the use of these techniques also produces lower yields. For example, use of these techniques of inexpensive depositions of multiple layers, depositions and removals of sacrificial materials, epitaxial growth steps, and multiple etching and stripping steps. In addition, some flip-and-bond processes require meticulous alignment of the various layers.

Conventionally, some SLMs also require the use of silicon on insulator (SOI) wafers. In addition to driving up the cost of SLM manufacturing, the use of SOI wafers requires that they be thinned using chemical mechanical planarization (CMP), which may cause the wafer to break or delaminate, and often causes the highest yield loss of all SLM processing steps.

What is desired is an SLM with improved reflective efficiency, SLM device long-term reliability, and simplified manufacturing processes.

SUMMARY OF THE INVENTION

The present invention is a spatial light modulator (SLM). In one embodiment, the SLM has addressing and control circuitry for the micro mirror array on a first substrate/layer. In addition, individually addressable electrodes are etched on a second substrate/layer and a selectively deflectable reflective micro mirror array fabricated on the second substrate. Alternatively, portions of the addressing and control circuitry are on a separate substrate and connected to the circuitry and electrodes on the first substrate.

The micro mirror array includes a controllably deflectable mirror plate with a highly reflective surface to reflect incident light. The mirror plate is connected to a cross-member by a connector, both of which are substantially concealed under the reflective surface. The cross-member connects to the corners of a base that is also part of the second substrate, as there is no spacer support frame or walls between the mirrors. In an example described herein, the absence of walls surrounding the mirrors allow for larger mirror size and a higher fill ratio than designs including walls. In addition, because there are no walls, the mirror plates require less space between them, maximizing the fill ratio and contrast ratio for the array.

Electrodes located on the second substrate control individual mirrors in the micro mirror array. The cross-member is fabricated from the second substrate, upon which the mirror plate and the connector are built. In one embodiment, the second substrate is a wafer of a single material, such as crystal silicon.

Further, because the cross-member is fabricated from a single crystal silicon material in one embodiment, the resulting cross-member is stronger and more reliable and suffers from virtually no memory effect, fractures along grain boundaries or fatigue. A single crystal silicon substrate has significantly fewer micro defects and cracks than other materials, especially deposited thin films. As a result, it is less likely to fracture (or to propagate micro fractures) along grain boundaries in a device.

The process used to manufacture the mirror minimizes the use of multi-layer thin film stacking and etching processes and techniques. Thus in one embodiment, sacrificial material deposition and removal is confined to the area surrounding the cross-member.

The SLM is fabricated with few steps, which keeps the fabrication cost and complexity low. Cavities are formed in a first side of the first substrate. In parallel, hydrogen ions are implanted on a first side of the second substrate. The first side of the first substrate is bonded to the first side of the second substrate. Then, a portion of the second substrate is cleaved off using hydrogen-induced silicon layer cleavage. Through this process, only minimal alignment (~0.5 mm) of the wafers is needed, and no thinning of the silicon wafer is required. Then a cross-member and electrodes are etched in the second substrate, a sacrificial material is deposited in the area around the cross-member, a reflective surface is deposited to create a mirror plate, the mirror plate is released by etching, to remove the sacrificial layer around the cross-member.

The net result is an easily manufacturable SLM that can achieve high optical efficiency and performance to produce high quality images reliably and cost-effectively.

DETAILED DESCRIPTION OF SPECIFIC EMBODIMENTS

Spatial Light Modulator Overview

Figure 1:
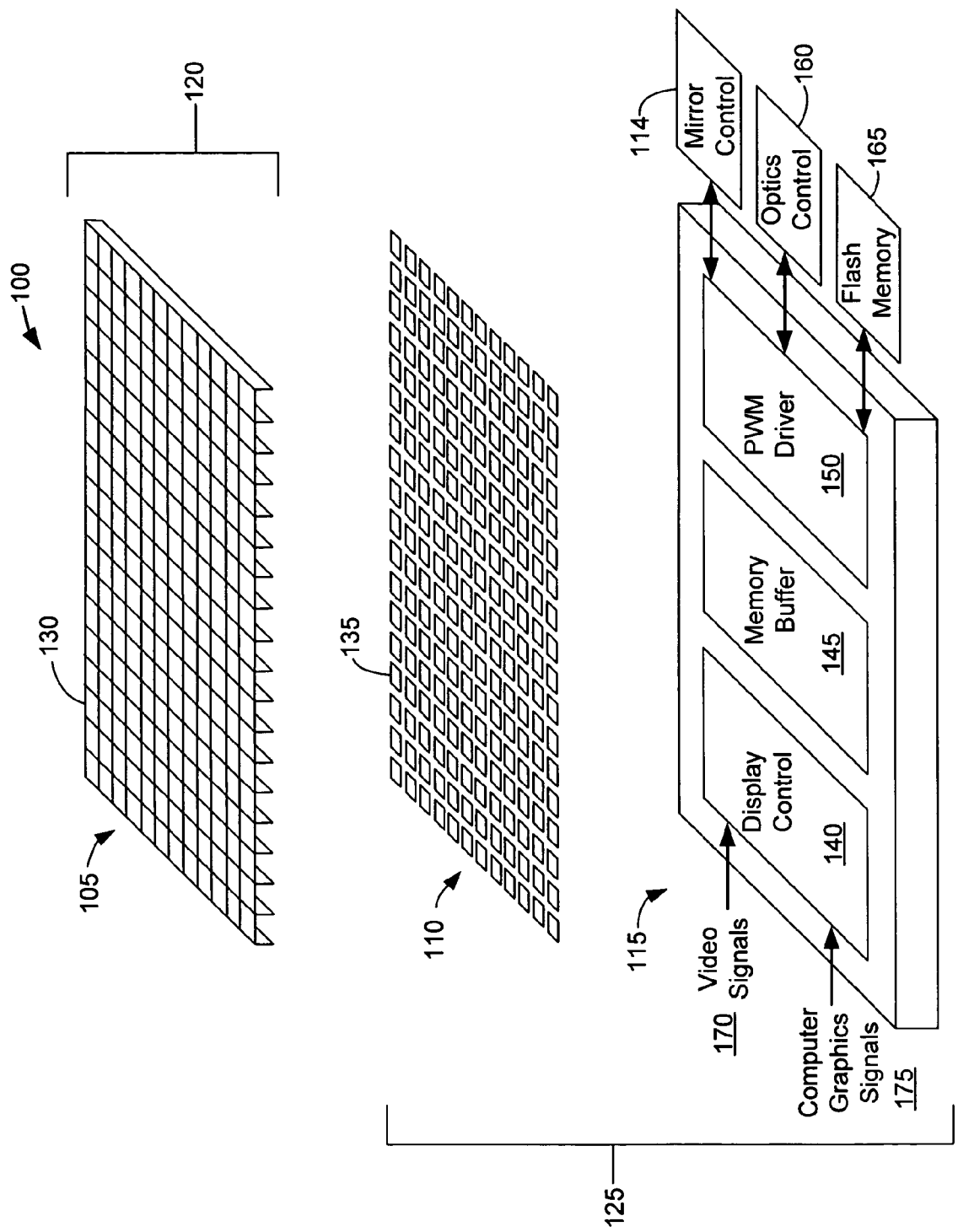
FIG. 1 is an illustration of the general architecture of a spatial light modulator according to one embodiment of the present invention.

Referring now to FIG. 1, there is shown a schematic diagram that illustrates the general architecture of a SLM 100 according to one embodiment of the invention. In this example, the SLM 100 has three layers. The first layer is a mirror array 105, the second layer is an electrode array 110, and the third layer is a layer of control circuitry 115.

In one embodiment, the mirror array 105 is fabricated from a first substrate/layer 120 that, upon completion of fabrication, is a single material, such as single crystal silicon in the SLM 100. The mirror array 105 has a plurality of deflectable micro mirrors 130.

The electrode array 110 has a plurality of electrodes 135 for controlling the micro mirrors 130. Each electrode 135 is associated with a micro mirror 130 and controls the deflection of that micro mirror 130. Addressing circuitry allows selection of a single electrode 135 for control of the particular micro mirror 130 associated with that electrode 135.

The control circuitry 115 has addressing circuitry, which allows the control circuitry 115 to control a voltage applied to selected electrodes 135. This control allows the control circuitry 115 to create deflections of the mirrors 130 in the mirror array 105 via the electrodes 135. Typically, the control circuitry 115 also includes display control logic 140, line memory buffers 145, a pulse width modulation array 150, and inputs for video signals 170 and graphics signals 175. A micro mirror controller 155, optics control circuitry 160, and a flash memory 165 may be external components connected to the control circuitry 115, or may be included in the control circuitry 115 in some embodiments. In various embodiments, some of the above listed parts of the control circuitry 115 may be absent, may be on a separate substrate/layer and connected to the control circuitry 115, or other additional components may be present as part of the control circuitry 115 or connected to the control circuitry 115.

After the layers 105, 110, and 115 are fabricated, they are bonded together to form the SLM 100. The first layer with the mirror array 105 covers the second 110 and third layers 115. However, in some embodiments the layers 105, 110, and 115 may be manufactured together. Therefore, the term "layer" is meant to be an aid for conceptualizing different parts of the spatial light modulator 100. The present invention uses fabrication techniques that allow the creation of small feature sizes, such as processes that allow fabrication of features of 0.18 microns, and processes that allow the fabrication of features of 0.13 microns or smaller. In other embodiments, various combinations of the electrodes 135 and components of the control circuitry 115 may be fabricated on different substrates and electrically connected.

The Mirror

Figure 2:
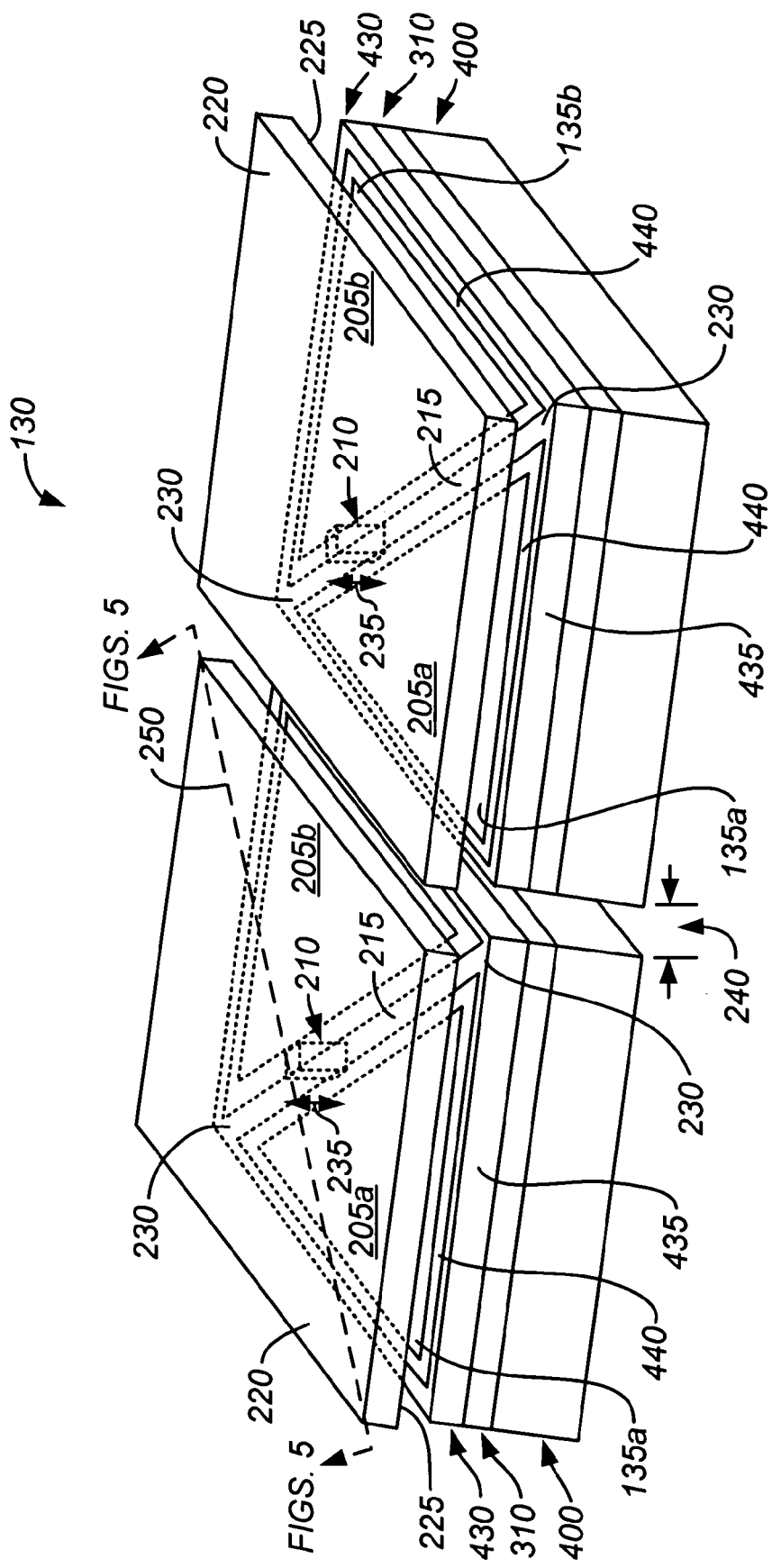
FIG. 2 is a perspective view diagram of a single micro mirror in accordance with one embodiment of the present invention.

Referring now to FIG. 2, there is shown a perspective view of two micro mirrors 130 in accordance with one embodiment of the present invention. In this example, the micro mirror 130 includes at least one mirror plate 205, a connector/pedestal 210, and a cross-member 215. The mirror plate 205 is the portion of the micro mirror 130 that is coupled to the cross-member 215 by a connector 210 and selectively deflected by applying a voltage bias between the mirror 130 and a corresponding electrode 135. In one embodiment, the mirror plate 205 is fabricated from a metal, aluminum in one embodiment, which acts as a reflective surface. In the embodiment shown in FIG. 2, the mirror plate 205 is substantially square in shape, and approximately fifteen microns by fifteen microns, for an approximate area of 225 square microns, although other shapes and sizes are also possible. The mirror plate 205 has an upper surface 220 and a lower surface 225. The upper surface 220 is preferably a highly smooth mirror surface and preferably constituting a large proportion of the surface area of the micro mirror 130. The upper surface 220 reflects light from a light source at an angle determined by the deflection of the mirror plate 205. The cross-member 215 is formed substantially beneath and is substantially concealed by the mirror plate 205.

The gap 240 between adjacent mirror plates 205 is only limited by the limitations of the fabrication technology and process and the cantilever effect of the mirrors, typically less than 0.5 micron. The close spacing of the mirror plates 205 and the hiding of the cross-member 215 allow for a high fill ratio for the micro mirror array 130, improved contrast ratio, and minimized scattering and diffraction of light.

As illustrated in FIG. 2, the mirror plate 205 is connected to a cross-member 215 by a connector 210. The cross-member 215 is formed substantially beneath and is substantially concealed by the mirror plate 205. The structures below the mirror 205 level are indicated by dotted lines for purposes of illustration. The cross-member 215 has two ends, each connected to a opposite corner 230 of a base portion of the second substrate/layer in the form of bias streets 435 that run in two directions through the array 100 and around the perimeter of individual mirrors 130. The cross-member 215 is diagonally oriented (e.g., at a 45 degree angle) with respect to either side of the mirror 130, with half of the mirror plate 205 on each side. Thus, the mirror plate 205 can be thought of as having two sides: a first side 205a and a second side 205b, each of which is controlled by a corresponding electrode 135 and 135b, respectively. Other hinges, cross-members, and connection schemes for the mirror plate 205 and cross-member 215 also could be used in alternative embodiments. In one embodiment, the cross-member 215 acts as a hinge and a spring.

In operation, either side 205a or 205b of the mirror plate 205 is attracted to one of the electrodes 135a or 135b beneath it and pivots downward to provide a wide range of angular motion. The cross-member 215 allows the mirror plate 205 to rotate about the axis of the cross-member 215 (diagonal across a plan view of the mirror plate 205) when a force such as an electrostatic force is applied to the mirror plate 205 by applying a voltage between the mirror 130 and the corresponding electrode 135. This rotation produces the angular deflection for reflecting light in a selected direction.

In one embodiment, the cross-member 215 is fabricated from single crystal silicon, a material that is stronger, more reliable, and suffers from virtually no memory effect, fractures along grain boundaries, or fatigue, all of which are common with cross-members made of from many other materials used in micro mirror arrays. In other embodiments, other materials may be used instead of single crystal silicon. One possibility is the use of another type of silicon (e.g., polysilicon or amorphous silicon) for the cross-member 215, or even making the cross-member 215 completely out of a metal (e.g., an aluminum alloy or tungsten alloy).

The connector 210 positions the mirror plate 205 at a predetermined distance 235 above the electrodes 135 and addressing circuitry so that the mirror plate 205 may deflect downward to a predetermined angle. The height 235 of the connector 210 is chosen based on the desired separation between the mirror plate 205 and the electrodes 135, and the topographic design of the electrodes 135. A larger height 235 allows more deflection of the mirror plate 205, and a higher maximum deflection angle. Generally, a larger deflection angle provides a higher contrast ratio. In one embodiment, the deflection angle of the mirror plate 205 is 12 degrees. In another embodiment, the mirror plate 205 can rotate as much as 90 degrees if provided sufficient spacing and drive voltage.

Figure 3A:
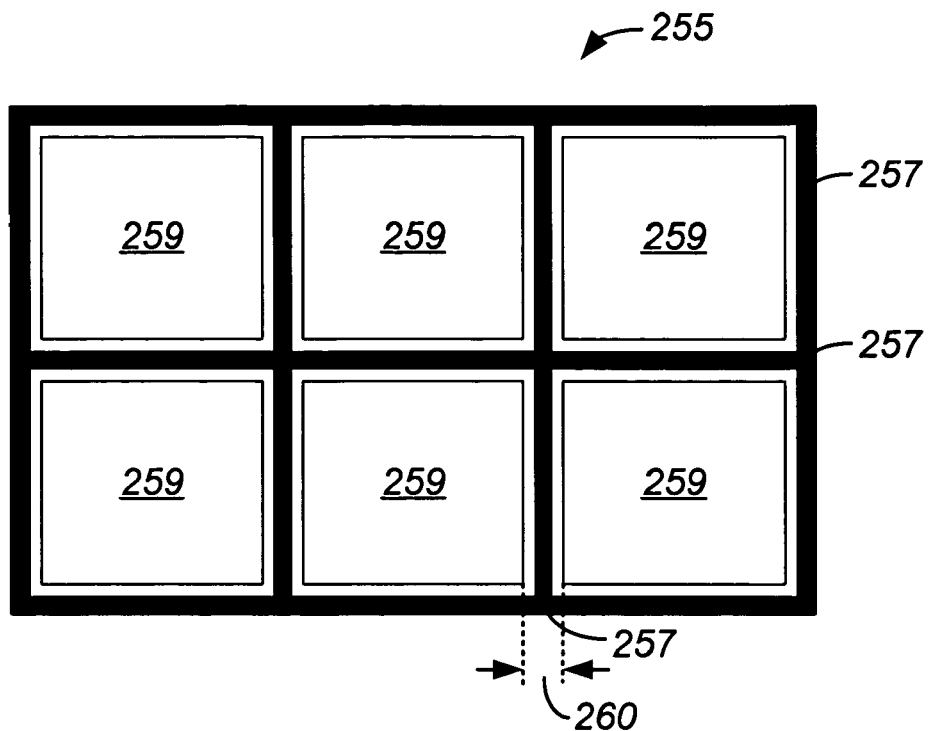
FIG. 3A is a plan view illustration of a prior art micro mirror array.
Figure 3B:
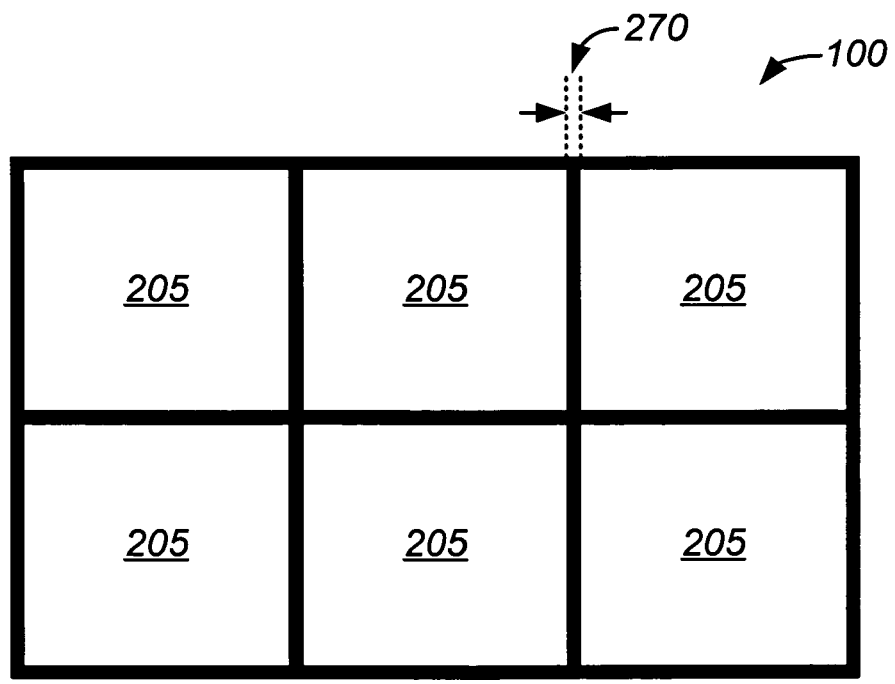
FIG. 3B is a plan view illustration of a portion of a micro mirror array in accordance with one embodiment of the present invention.

Because there are no spacer support walls between adjacent mirror plates 205, the mirror plates 205 are placed closely together to increase the fill ratio of the mirror array 130. The gap 240 between mirror plates 205 can be made as small as the feature size supported by the fabrication technique, angle of deflection, and size of mirror. Thus, in one embodiment, the gaps 240 are 0.5 micron. Without walls, the size of the gaps 240 can further decrease only with decreased mirror size. Embodiments of the present invention allow high fill ratios. In one embodiment, the fill ratio is 89% or higher. FIG. 3B shows the close spacing of the micro mirrors in comparison with prior art devices, such as illustrated in FIG. 3A. As shown, the walls 257 between mirrors 259 in the prior art array 255, shown in FIG. 3A, necessitate a larger distance 260 between mirrors 259 than the distance 270 between the mirrors 205 of the array 100 of the present invention, as shown in FIG. 3B.

In some embodiments; the micro mirror 130 includes motion stops (not shown) that stop the deflection of the mirror plate 205 as known in the art. When present, the motion stops prevent the mirror plate 205 from deflecting further than the angle provide by the stops. There are several possible configurations for the motion stops. The present invention is not limited to the elements or techniques for stopping the deflection of the mirror plate 205 described herein. Any elements and techniques known in the art may be used.

Workflow Process

Figure 4:
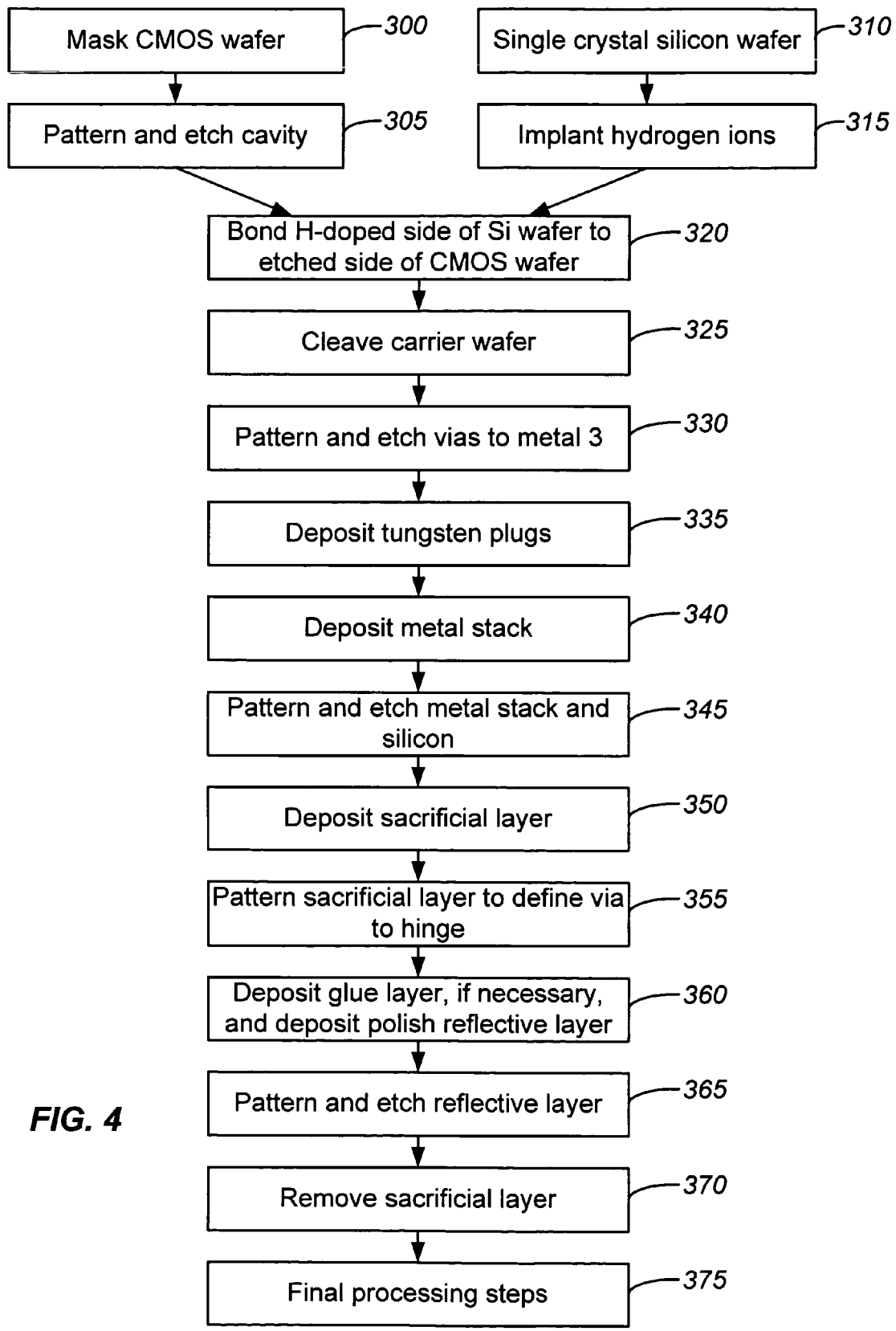
FIG. 4 is a flowchart illustrating fabrication of a spatial light modulator in accordance with one embodiment of the present invention.
Figure 5A:
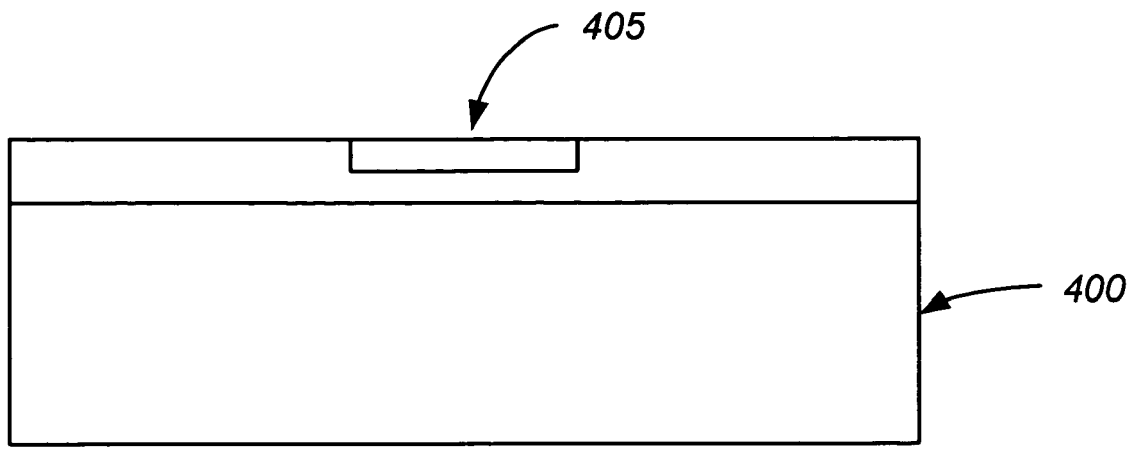
FIGS. 5A through 5I are cross-sectional diagrams illustrating in greater detail the substrates at various steps in the fabrication of a spatial light modulator in accordance with one embodiment of the present invention.
Figure 6A:
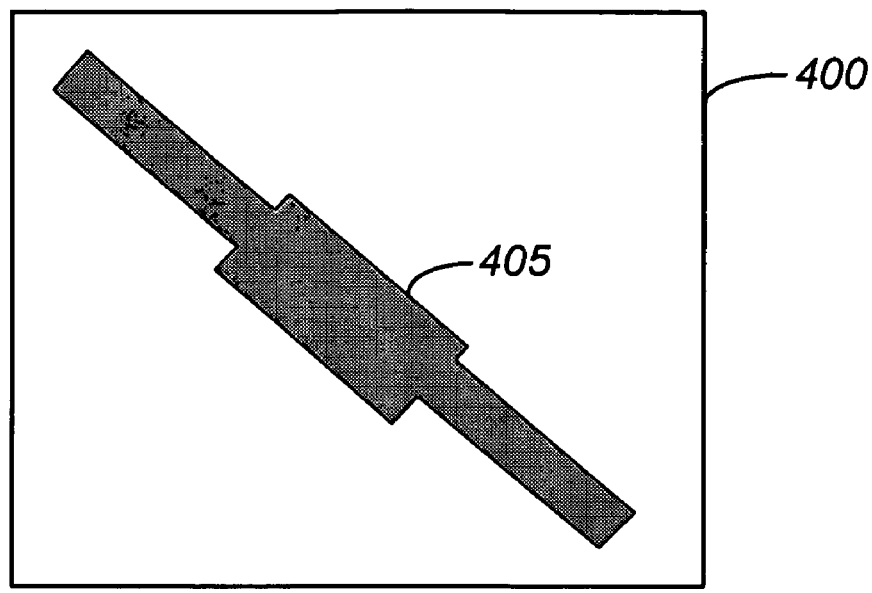
FIGS. 6A through 6I are plan view diagrams illustrating in greater detail the substrates at various steps in the fabrication of a spatial light modulator in accordance with one embodiment of the present invention.

Referring now to FIG. 4, there is shown a flowchart depicting steps for manufacturing the SLM 100 in accordance with one embodiment of the present invention. The process begins with a standard CMOS wafer, which can be purchased or manufactured using methods known in the art. A mask is generated 300 and put on the CMOS wafer to initially partially fabricate the micro mirrors 130. One embodiment of this mask is shaped substantially like a polygon as illustrated in FIG. 6A and defines the area that will not be etched 305 from one side of the first substrate 115. The mask is made of a photoresist material or other dielectric material, such as silicon oxide or silicon nitride, which will prevent the first substrate 115 beneath from being etched. The CMOS wafer is etched 305 to create a shallow cavity centered between buried metal electrode connection pads on the CMOS wafer. FIG. 5A shows a cross-sectional view of the CMOS wafer 400 along dashed line 250 in FIG. 2, illustrating the shape and placement of the cavity 405 in accordance with one embodiment of the present invention. FIG. 6A shows a plan view of the CMOS wafer 400 with the etched cavity 405. This step creates the cross-member cavity 405 which the cross-member 215 will be suspended over and move within. In a preferred embodiment, the CMOS wafer 400 has a thickness of about 700 microns to about 750 microns and the cavity 405 has a depth of about 0.5 to 1.0 microns, depending on the width of the cross member 215. Standard dielectric etch chemistries widely known and used in the art would be used for the etch.

Figure 5B:
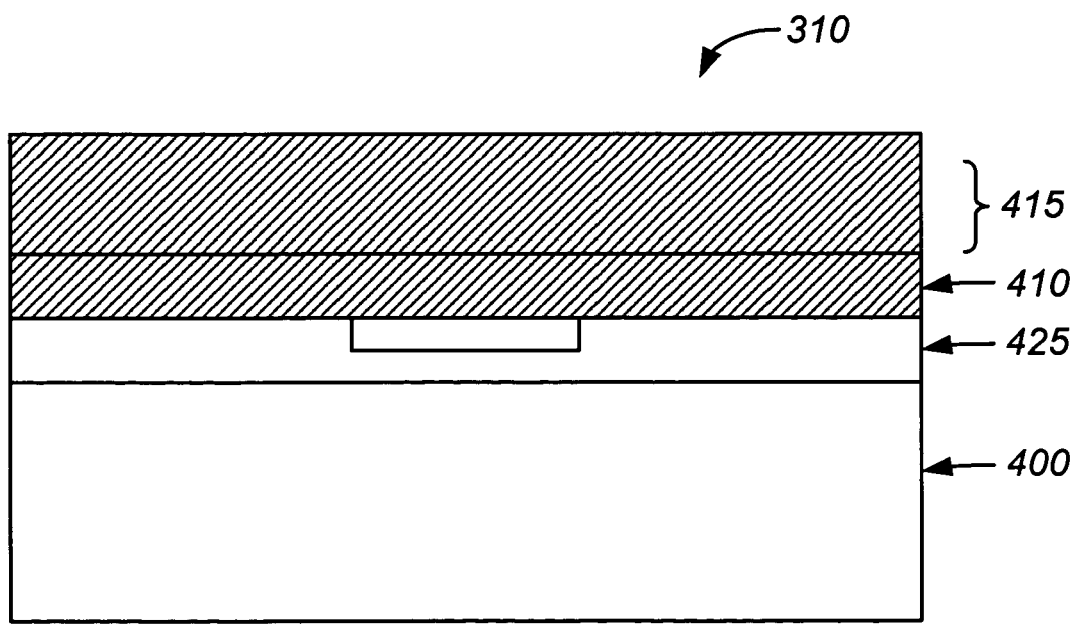
Figure 6B:
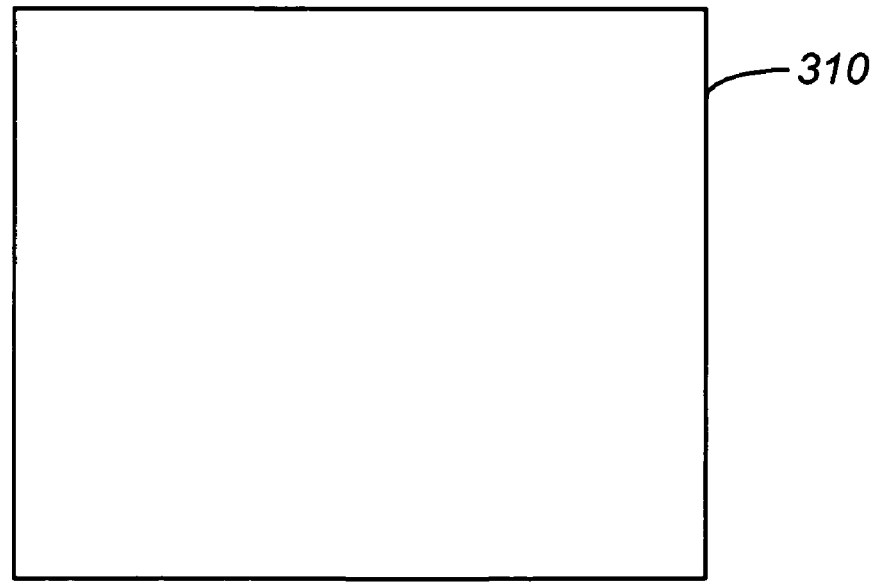

Referring again to FIG. 4, separately from the fabrication of the cavity 405 in the CMOS wafer 400, a second fabrication begins with a single crystal silicon wafer 310. The single crystal silicon wafer 310 is hydrogen doped 315 on one side, implanting hydrogen ions to a predetermined depth. In one embodiment, a <100> silicon wafer 310 is implanted with 40 keV protons to a variety of ion doses ranging from $1\times10^{16}$ to $1\times10^{17}$ cm$^{-2}$ at a predetermined depth of 2-6K Angstroms (Å). Then, the hydrogen-doped side of the single crystal silicon wafer 315 is bonded 320 to the etched side of the CMOS wafer 400. In one embodiment, the bonding occurs at room temperature or slightly higher. FIG. 5B shows a cross-section view of the CMOS wafer 400 along dotted line 250 in FIG. 2, illustrating the CMOS wafer 400 bonded to the single crystal silicon wafer 310. The hydrogen ion implantation line is indicated at arrow 410. The portion of the single crystal silicon wafer 310 on the unbonded side of the hydrogen ion implantation line 410 is referred to as the carrier wafer 415. FIG. 6B shows a plan view of the single crystal silicon wafer 310 covering the CMOS wafer 400. Bonding the CMOS wafer 400 to the single crystal silicon wafer 310 has several advantages over processes requiring alignment of the layers. For example, this method provides large bonding surfaces and only minimal alignment (~0.5 mm) is required of the single crystal silicon wafer 310 and CMOS wafer 400. In one embodiment, all alignment tolerances can be met at <0.1 μm based on standard 0.18 to 0.25 μm foundry process flow capability.

Figure 5C:
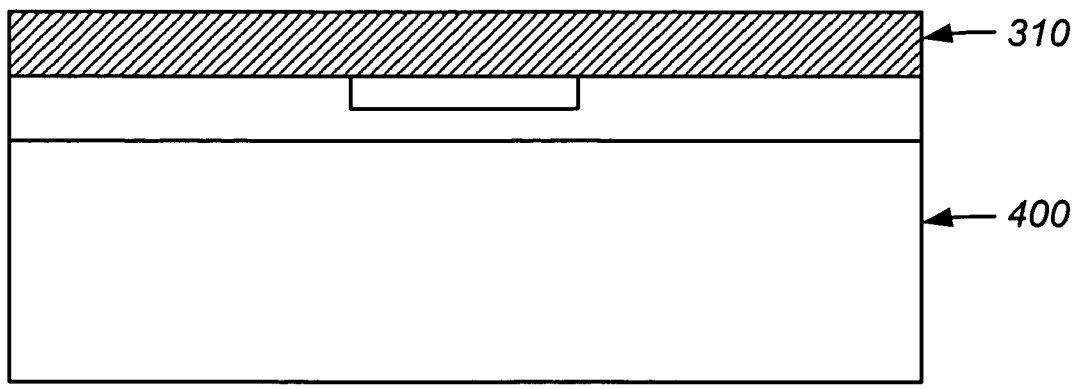
Figure 6C:
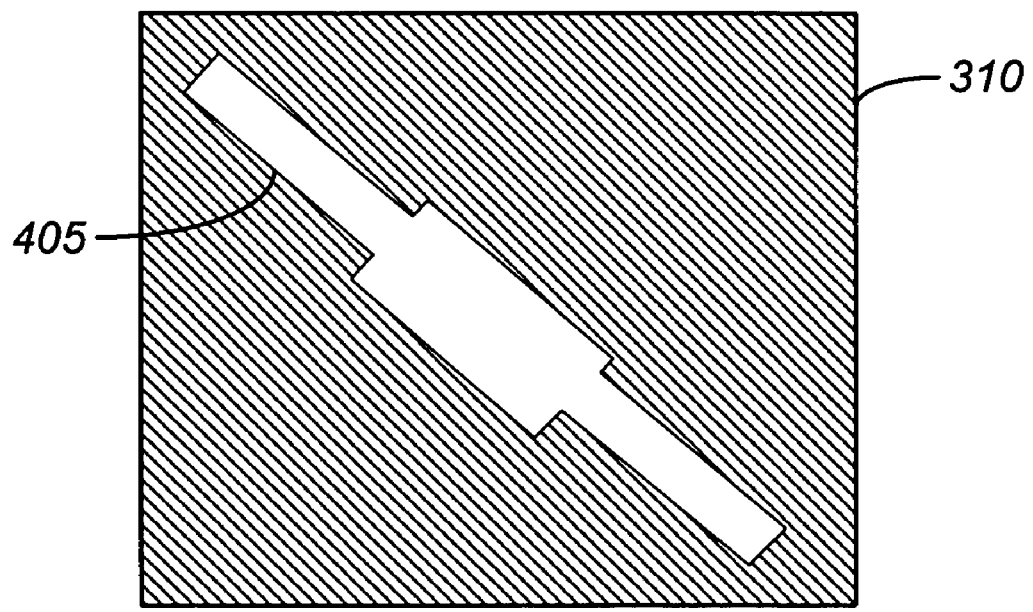

Referring again to FIG. 4, the carrier wafer portion 415 of the single crystal silicon wafer 310 is cleaved 325 at the hydrogen ion implantation line 410 through a physical or heat cleave process at temperatures less than 400° C. The result is that only a thin layer, in this example 2-6K Å, of the single crystal silicon wafer 310, the portion from the hydrogen ion implantation line 410 to the CMOS wafer 400 remains bonded to the CMOS wafer 400. The hydrogen implant depth is easily controllable through this process, is accurate to less than 5% of the total thickness of the single crystal silicon wafer 310, and is uniform within the die and from die to die. FIG. 5C shows a cross-sectional view of the CMOS wafer 400 along dotted line 250 in FIG. 2 bonded to the remaining single crystal silicon wafer 310. FIG. 6C shows a plan view of the thinned single crystal silicon wafer 310. The thin single crystal silicon wafer 310 is semitransparent and thus the silhouette of the cavity 405 and alignment marks for the next lithography step are visible through the crystal silicon wafer 310.

This process has numerous advantages over the use of an SOI wafer. First, the cost of an SOI wafer is much higher than a single crystal silicon wafer 310. In addition, SOI wafers create additional steps in the manufacturing process, as they must be thinned or ground down using, for example using chemical mechanical polish (CMP) and then wet or dry etched. The thinning of the SOI wafer may cause the wafer to break or delaminate, and often is the source of the highest yield loss of all SLM processing steps. In contrast, hydrogen-induced silicon layer cleavage requires no grinding or thinning of the single crystal silicon wafer 310 and thus reduces the chance of breakage.

Figure 5D:
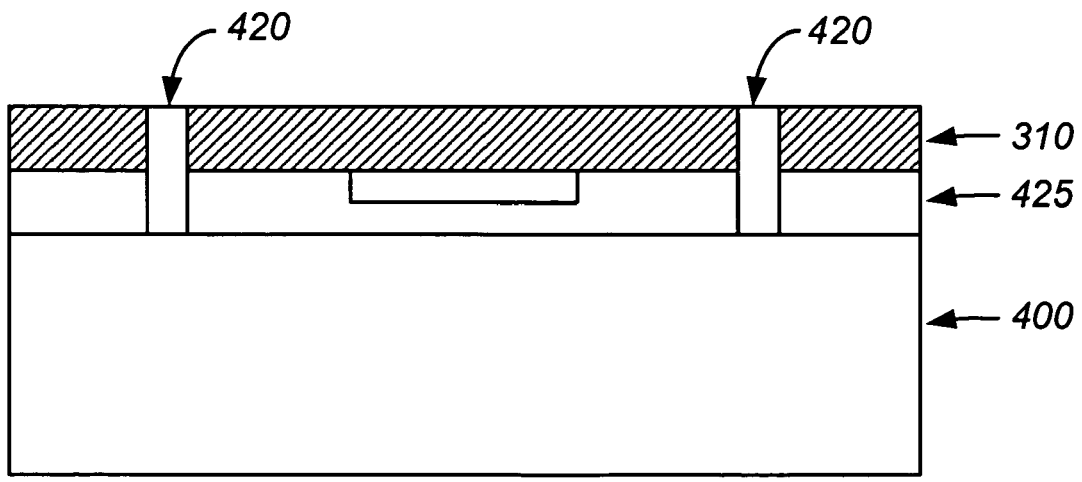
Figure 6D:
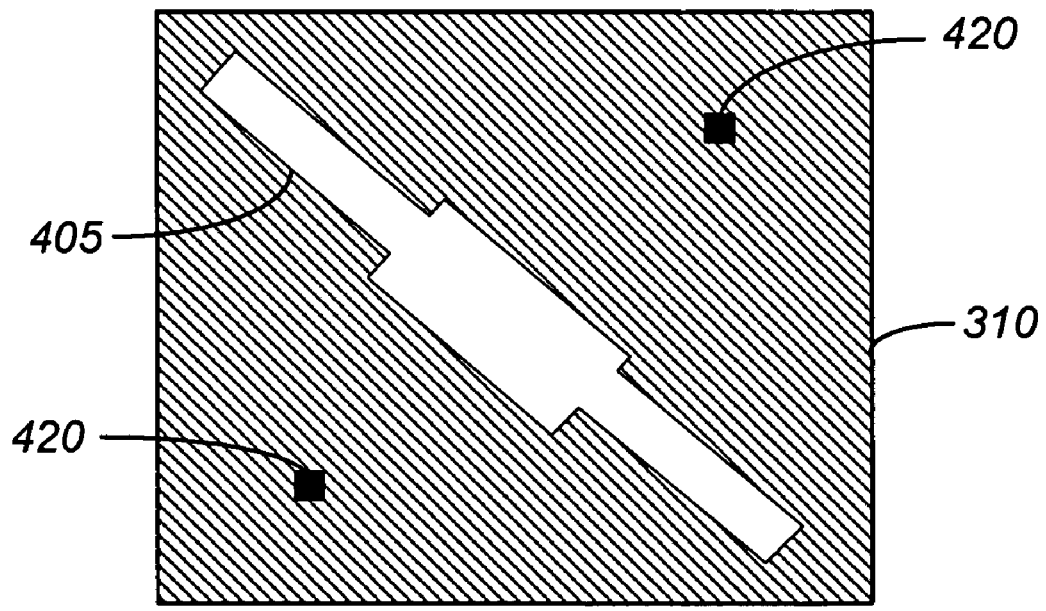

Referring again to FIG. 4, the layers 400, 310 are patterned and vias (shown filled by plugs 420) are etched 330 down to contact the metal interconnect 425 of the CMOS wafer 400. Etching is by the methods described above in conjunction with step 305. Then, metal "plugs" 420 are deposited in the vias and etched back if necessary. In one embodiment, the metal used for the plugs is tungsten or titanium tungsten. The plugs 420 provide electrical connection between the metal interconnect 425 of the CMOS wafer 400 and the metal layer to be deposited on top of the single crystal silicon 310, as well as the single crystal silicon layer 310 itself, as described in the next step 240. Etching back may not be required, depending on film deposition accuracy. Metal maybe left in place for additional conductivity or etch back can be used to leave the silicon as the electrode (with vias connecting the silicon to the metal interconnect). FIG. 5D shows a cross-sectional view of vias (420) etched in the wafers 400, 310, along dotted line 250 in FIG. 2, filled with tungsten plugs 420. FIG. 6D shows a plan view of the wafers 400, 310 with tungsten plugs 420 in the vias down to metal 3 (425) of the CMOS wafer 400.

Figure 5E:
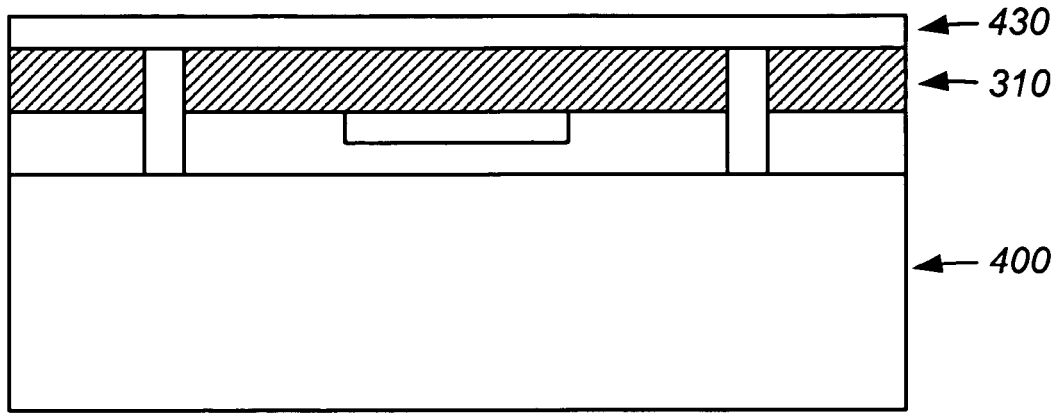
Figure 6E:
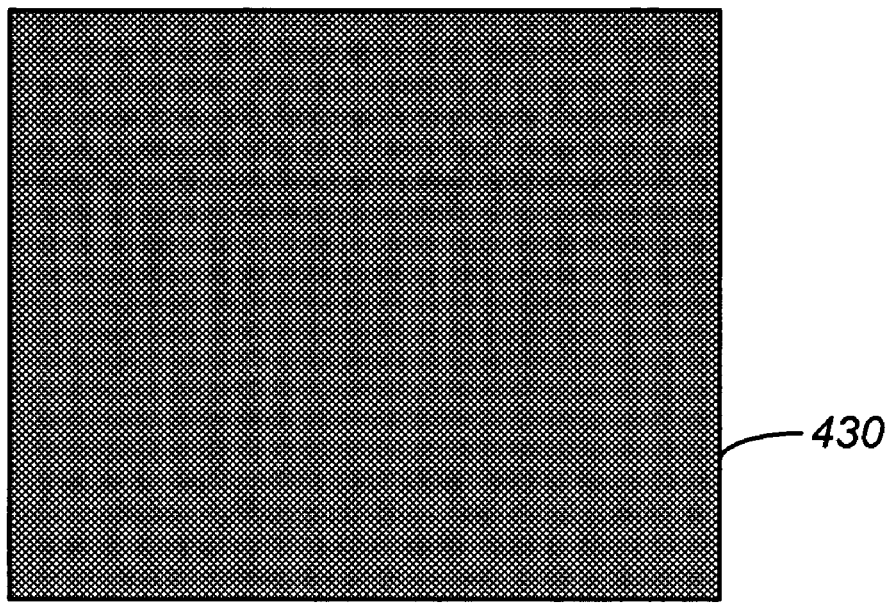

Referring again to FIG. 4, a metal stack 430 is deposited 240 on top of the single crystal silicon layer 310. In on embodiment, the stack 430 is aluminum/titanium tungsten or titanium nitride (or other single or multilayer metal stack), to a total thickness of <500-1000 Å. The metal stack 430 serves as a hard stopping surface for the micro mirror, is a high electrical conductor, and could be chosen such that it is anti-reflective. FIG. 5E shows a cross-sectional view of the metal stack 430 above the single crystal silicon wafer 310 along dotted line 250 in FIG. 2. FIG. 6E shows a top plan view, with the metal stack 430 concealing the layers below.

Referring again to FIG. 4, the metal stack layer 430 and single crystal silicon layer 310 are patterned and etched 345 to release a cross-member 215 and isolate and open an electrode pattern. In one embodiment, the electrodes are silicon with anti-reflective titanium nitride on top. This composition simplifies the under mirror structure, as it eliminates the need for a metal 4 layer. In addition no buried bias metal interconnect is needed due to large "streets" 435 that remain around the edges of the silicon 310 and metal stack 430 layers, forming a base for the cross-member 215 to attach to. In one embodiment, the bias streets 435 have a width several microns or more. The connection between the mirror plate 205 and the bias streets 435 significantly increases the current speed and path to the mirror plate 205, which keeps bias potential even across the mirrors 205 and reduces stiction or charge up. Thus no separate touch down electrode is needed to keep mirrors 205 at constant bias, as the mirror plate 205 will land on the bias streets 435 and be continuous through the connector 210 and sufficiently biased through the connector 210.

Figure 5F:
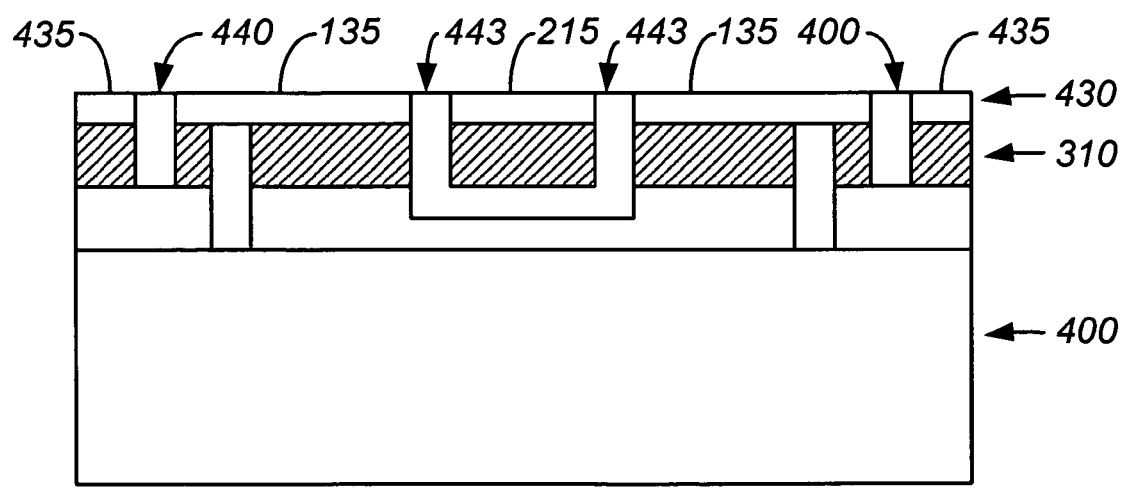
Figure 6F:
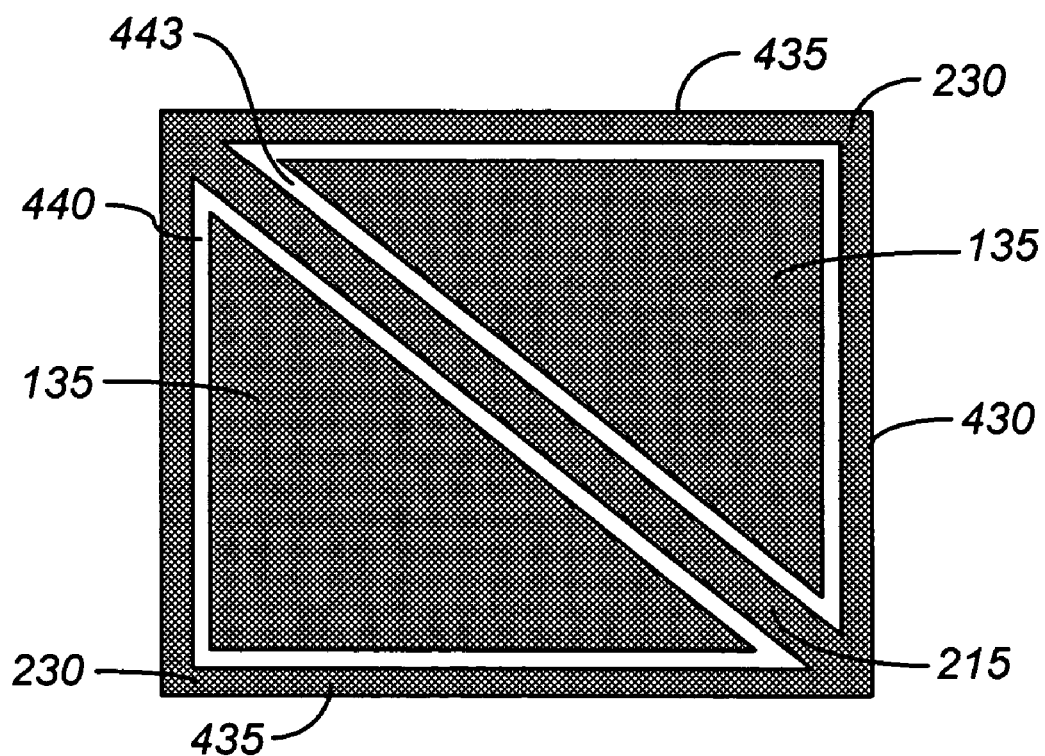

FIG. 5F shows a cross-sectional view of the addition of the patterned metal stack layer 430 along dotted line 250 in FIG. 2, detailing the layout of the cross-member 215, electrodes 135, bias streets 435, opened areas 443 beside the cross-member 215 connecting to the cavity 405 in the CMOS wafer 400, and open areas 440 near the bias streets 435. FIG. 6F shows a plan view showing the layout of the cross-member 215, electrodes 135, bias streets 435, and opened areas 440, 443. The cross-member 215 is suspended over the cavity 405 etched in the CMOS wafer 400, but the ends 230 (shown in FIG. 2 and FIG. 6F only) of the cross-member 215 remain connected to the edges of the metal stack layer 430 and silicon layer 310 and continuous with the bias streets 435.

Referring again to FIG. 4, a layer 445a of sacrificial material, such as photoresist, is then deposited 350 above the metal stack layer 430, filling the open areas 440 beside the cross-member 215 and the cavity 405 in the CMOS wafer 400. The photoresist 445a can be spun on and baked at 90-100° C. The thickness of the sacrificial layer can be selected to the desired height for the mirror plate 205. In one embodiment, the thickness is about 2 microns.

Figure 5G:
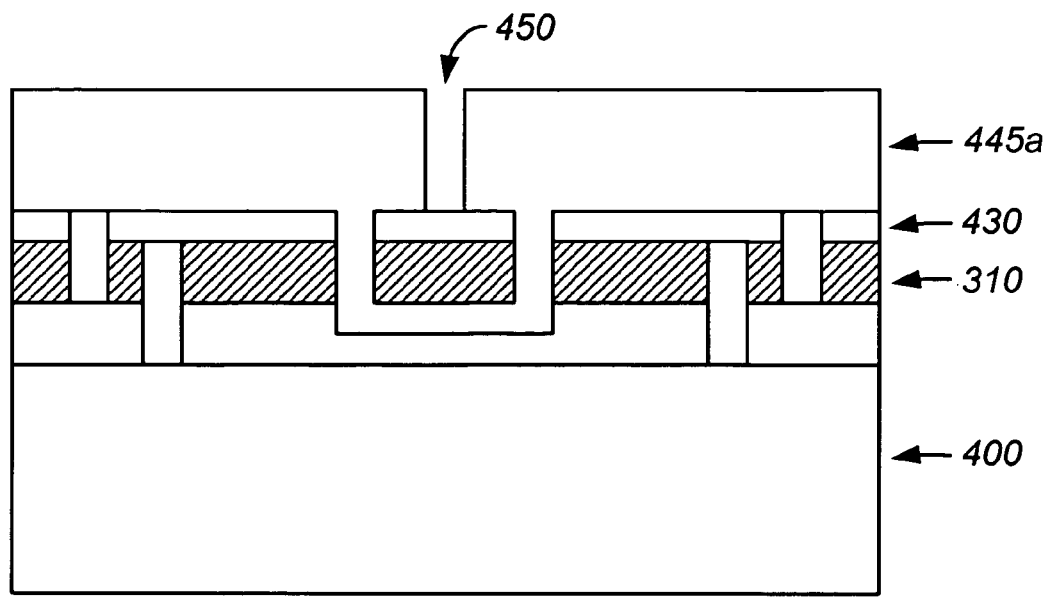
Figure 6G:
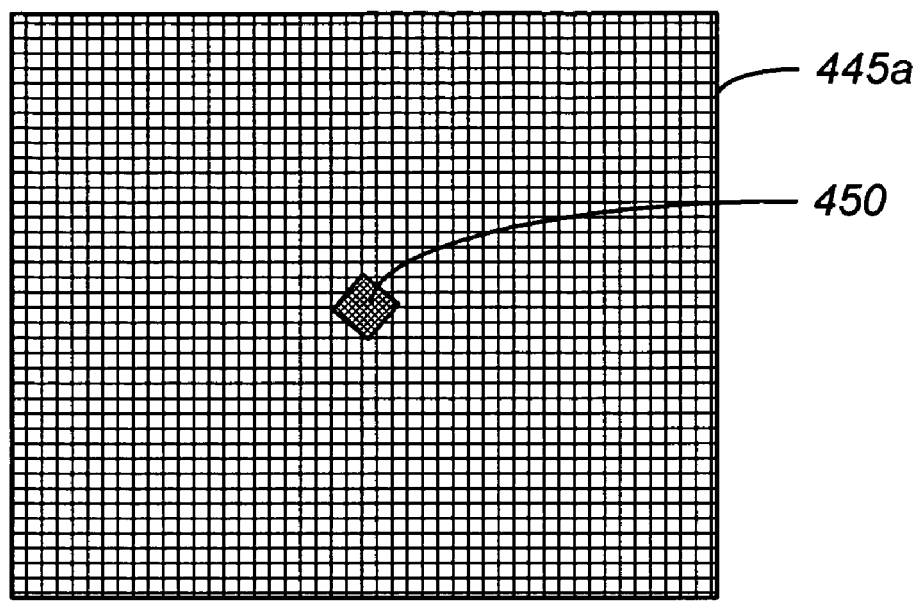
Figure 6H:
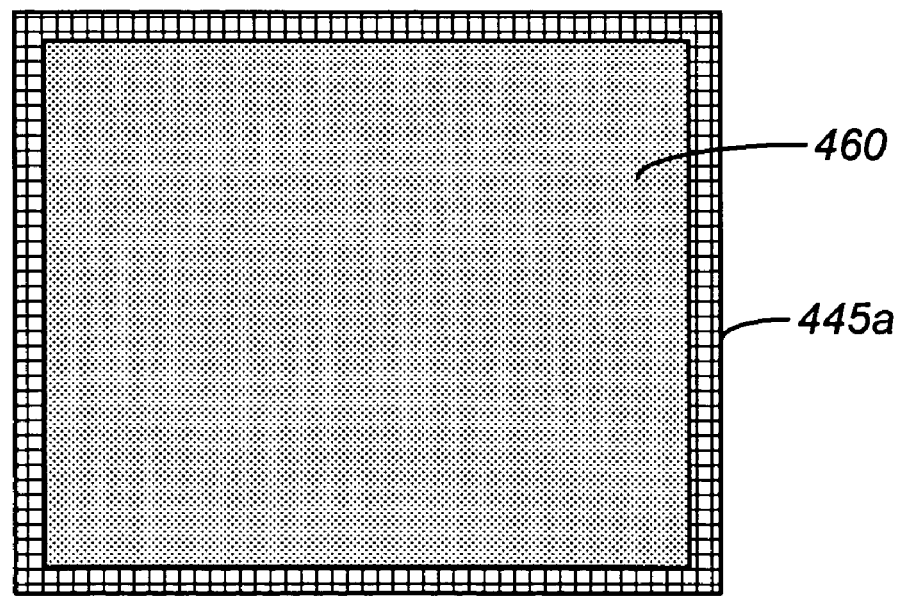

Then, the photoresist layer 445a is patterned 355 to define a via down to the cross-member 215. FIG. 5G shows a cross-sectional view of the addition of the photoresist 445a and the via 450 down to the cross-member 215 along dotted line 250 in FIG. 2. FIG. 6G shows a top view wherein the photoresist 445a conceals the layers below except where the via 450 reveals a portion of the metal stack layer 430.

Referring again to FIG. 4, if needed an adhesive layer (not shown) is then deposited, followed by depositing 360 a reflective layer 460, such as mirror aluminum or any other reflective material known in the art. The reflective layer 460 is deposited 360 as a hot vapor through CVD or PVD, which will plate and fill the via 450 hole, and create the mirror plate 205. The need for an adhesive layer is dependent in part on the material used for the layers coming into contact, the reflective 460 and stack 430 layers. The reflective layer 460 must adhere strongly to the stack layer 430 so that it will not break when pulled down by the actuation voltage. For example, in one embodiment in which both surfaces are metal, an adhesive layer may not be needed. Alternatively, an intermediate layer may be desired for metal-to-metal contact because the hot vapor reflective layer material 460 may not adhere well to a comparatively cold metal surface 430. Alternatively, another embodiment uses an aluminum or tungsten reflective layer 460 down to a single crystal silicon line 430. In this example, a silicide is deposited, which will diffuse into both the metal and the single crystal silicon to firmly bond the layers.

Figure 5H:
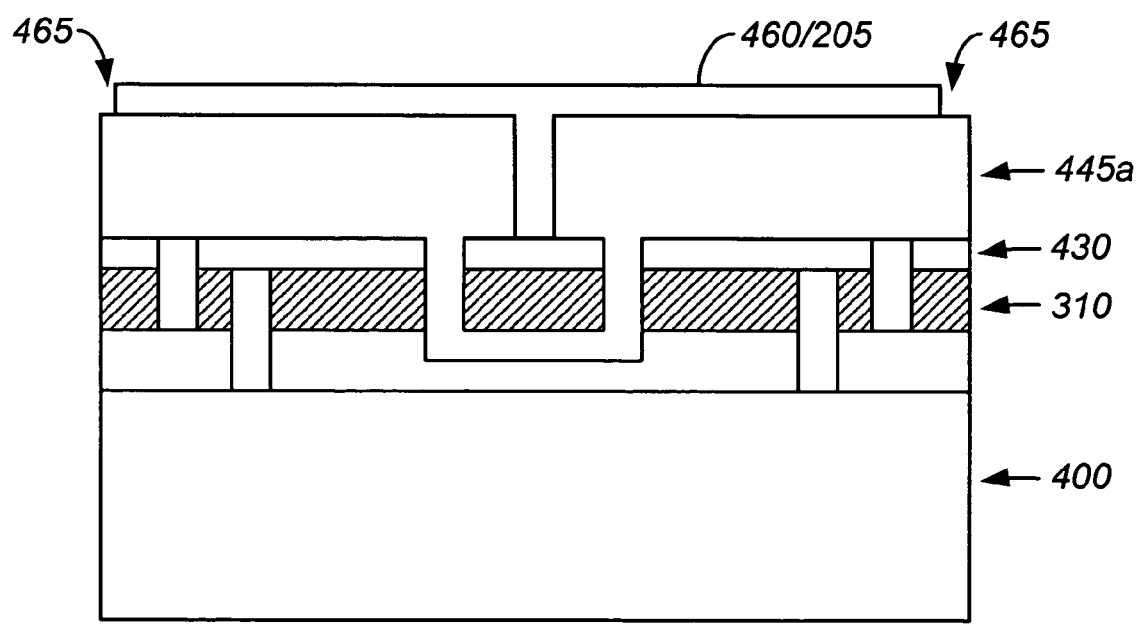

In one embodiment the reflective layer 460 is deposited 360 to a thickness of 2-6K Å, and polished back to the desired finish and thickness to form the mirror plate 205. In one embodiment, the desired thickness of the mirror plate 205 is 0.4 microns. Then, the mirrors are patterned and etched 365 using standard metal etch chemistry. In one embodiment, the reflective layer 460 is made of 100% aluminum, which eliminates any thermal problems associated with metal to silicon contact in a multilayer mirror. FIG. 5H shows a cross-sectional view of the deposited mirror 360/mirror plate 205 along dotted line 250 in FIG. 2, including etched areas 465 above the sacrificial layer 445a. FIG. 5H shows a plan view, in which the mirror plate 205 conceals most of the layers below, revealing only the edges of the sacrificial layer 445a. In this process, there are no spacer support walls between the mirrors 205, which are separated only by open spaces 240 between them. Therefore, the area of the mirror surface 205 in this design is substantially larger than designs in which a spacer wall separates the mirrors 205, allowing for a higher fill ratio.

Figure 5I:
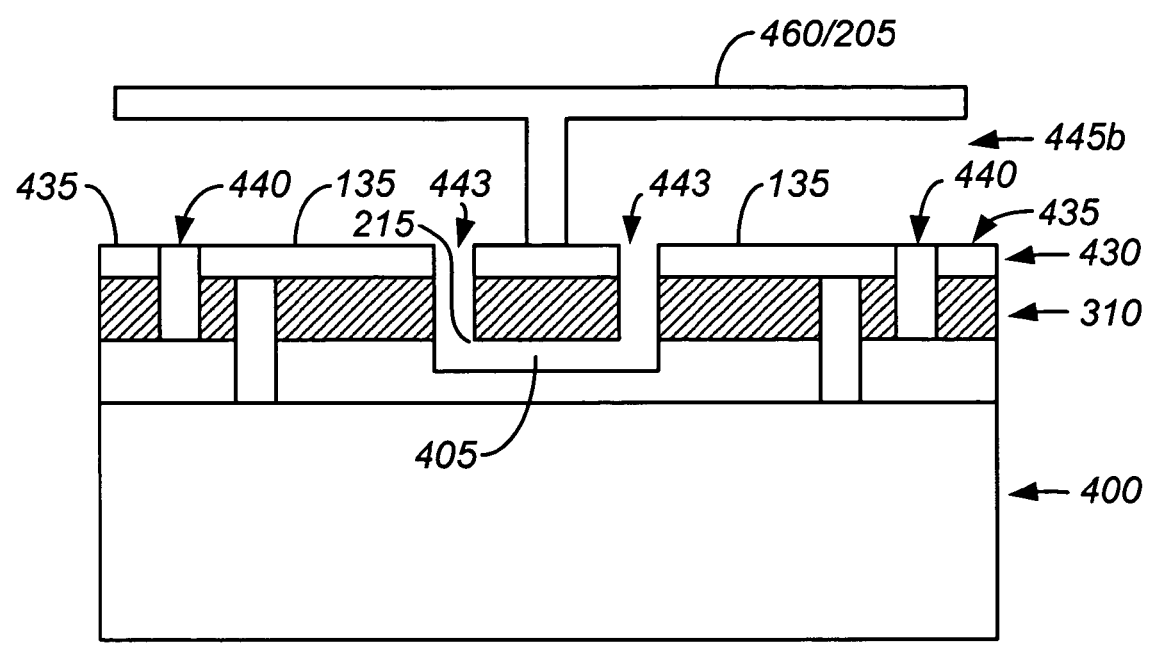
Figure 6I:
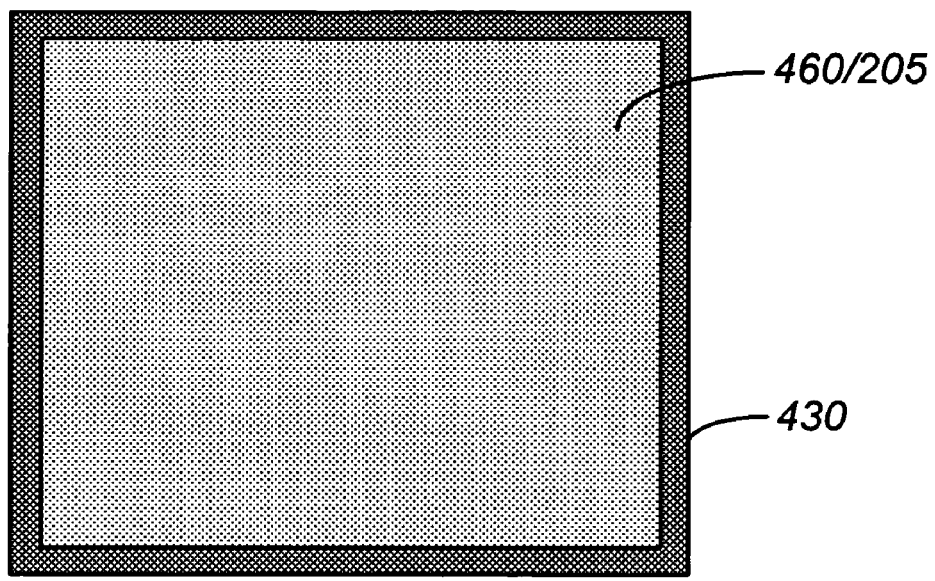

After the etch 365 of the reflective surface, the mirror plate 460 is released, however, the cross-member 215 is still held in place by the sacrificial material 445a and cannot rotate around the cross-member 215. Referring again to FIG. A, the mirror plate 460 then is released by removal 370 of the sacrificial layer 445a. In one embodiment, in which the sacrificial layer 445a is photoresist, the removal 370 is by downstream oxygen ashing using an $O_2$ chamber. In other embodiments, other chemistries are used to ensure clean surfaces and no contamination. FIG. 5I shows a cross-sectional view of the layers along dotted line 250 in FIG. 2 after removal of the sacrificial layer 445a. In one embodiment, ashing 370 removes photoresist 445a from the cavity 405, opened areas 440, and area between the metal stack 430 and mirror 460 layers, revealing a gap 445b where the photoresist 445a was previously. FIG. 6I shows a top plan view, in which the mirror plate 205 conceals most of the layers below, revealing only the edges of the stack layer 430. After the sacrificial material 445a is removed 370, the cross-member 215 is released and the mirror plate 460 is free to rotate about the cross-member 215. By following the above fabrication steps, the result is a cross-member 215 that is formed substantially beneath the mirror plate 205, and thus is concealed by the reflective surface of the mirror plate 205.

Figure 7:
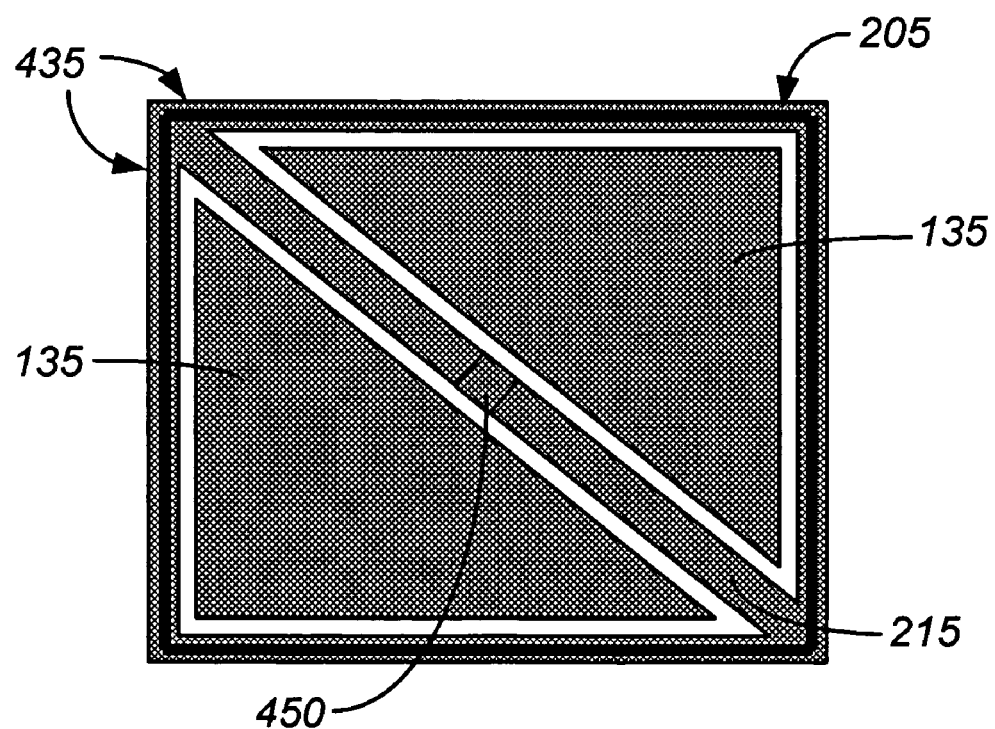
FIG. 7 is a plan view of a single micro mirror in accordance with one embodiment of the present invention.

FIG. 7 shows a plan view of a single micro mirror in accordance with one embodiment of the present invention, in which the mirror plate 205 is transparent for illustration purposes, with just the outline of the plate 205 shown with a thickened line. With this transparent illustration, the layout of the electrodes 135, cross-member 215, bias streets 435, and connector 450 can be seen as they appear under the mirror plate 205.

Referring again to FIG. 4, standard final processing steps known in the art such as covering with a glass layer, die separation, and packaging are performed 375. In some embodiments, the micro-mirror array 120 is protected by a piece of glass or other transparent material. As discussed above, multiple SLMs 100 may be fabricated at once. However, if multiple SLMs 100 are fabricated together, they must be separated into the individual SLMs 100. There are many ways to separate each spatial light modulator 100 and ready it for use. In one embodiment, the die is packaged wafer scale. In one embodiment, final processing steps 375 include packaging each separated spatial light modulator 100 using standard packaging techniques.

Mirror Operation

Referring again to FIGS. 1, 2, and 6I, in operation, individual reflective micro mirrors 130 are selectively deflected and serve to spatially light. A voltage is applied to an electrode 135 on one side of the mirror 130 to control the deflection of the corresponding part of the mirror plate 205 above the electrode 135 (side 205a in FIG. 2). When a voltage is applied to the electrode 135, half of the mirror plate 205a is attracted to the electrode 135 and the other half of the mirror plate 205b is moved away from the electrode 135. A voltage that causes the mirror plate 205 to fully deflect downward until stopped by the physical elements that stop the deflection of the mirror plate 205 is known as a "snapping" or "pulling" voltage. Thus, to deflect the mirror plate 205 fully downward, a voltage equal or greater to the snapping voltage is applied to the corresponding electrode 135. When the mirror plate 205 deflects past the "snapping" or "pulling" voltage, approximately 15 volts or less in one embodiment, the restoring mechanical force or torque of the cross-member 215 can no longer balance the electrostatic force or torque and the half of the mirror plate 205 having the electrostatic force under it, 205a or 205b, "snaps" down toward the electrode 135 under it to achieve full deflection, limited only by the motion stops, if any. This activity causes the mirror plate 205 to rotate about the cross-member 215.

In one embodiment, when the voltage is removed from the electrode 135, the cross-member 215 causes the mirror plate 204 to spring back to its unbiased position. In another embodiment, a voltage may be applied to the electrode 135 on the other side (205b) of the mirror plate 205 to deflect the mirror in the opposite direction. Thus, light striking the mirror 205 is reflected in a direction that can be controlled by the application of voltage to the electrode 135.

The micro mirror 205 is an electromechanically bistable device. Given a specific voltage between the releasing voltage and the snapping voltage, there are two possible deflection angles at which the mirror plate 205 may be, depending on the history of mirror 205 deflection. Therefore, the mirror 205 deflection acts as a latch. These bistability and latching properties exist since the mechanical force required for deflection of the mirror 205 is roughly linear with respect to deflection angle, whereas the opposing electrostatic force is inversely proportional to the distance between the mirror plate 205 and the electrode 135.

Since the electrostatic force between the mirror plate 205 and the electrode 135 depends on the total voltage difference between the mirror plate 205 and the electrode 135, a negative voltage applied to a mirror plate 205 reduces the positive voltage needed to be applied to the electrode 135 to achieve a given deflection amount. Thus, applying a voltage to a mirror array 105 can reduce the voltage magnitude requirement of the electrodes 135.

Since the maximum deflection of the mirror 205 is fixed, the SLM 100 can be operated in a digital manner if it is operated at voltages past the snapping voltage. The operation is essentially digital because the mirror plate 205 is either fully deflected downward by application of a voltage to the associated electrode 135 on one side of the mirror plate 205a or 205b or deflected downward to the other side of the mirror plate 205b or 205a when energizing the other electrode 135 on the other side of the mirror plate 205.

In video display applications, when the mirror plate 205 is fully deflected downward, the incident light on that mirror plate 205 is reflected to a corresponding pixel on a video display screen, and the pixel appears bright. When the mirror plate 205 is allowed to spring upward, the light is reflected in such a direction so that it does not strike the video display screen, and the pixel appears dark.

During such digital operation, it is not necessary to keep the full snapping voltage on an electrode 135 after an associated mirror plate 205 has been fully deflected. During an "addressing stage," voltages for selected electrodes 135 that correspond to the mirror plates 205 which should be fully deflected are set to levels required to deflect the mirror plates 205. After the mirror plates 205 in question have deflected due to the voltages on electrodes 135, the voltage required to hold the mirror plates 205 in the deflected position is less than that required for the actual deflection. This is because the gap between the deflected mirror plate 205 and the addressing electrode 135 is smaller than when the mirror plate 205 is in the process of being deflected. Therefore, in the "hold stage" after the addressing stage the voltage applied to the selected electrodes 135 can be reduced from its original required level without substantially affecting the state of deflection of the mirror plates 205. One advantage of having a lower hold stage voltage is that nearby undeflected mirror plates 205 are subject to a smaller electrostatic attractive force, and they therefore remain closer to a zero deflected position. This improves the optical contrast ratio between the deflected mirror plates 205 and the undeflected mirror plates 205.

In one embodiment, the voltages are as follows. The total voltage is about ~35V, snap voltage is that on the electrode ~15V, and bias of about ~20V. The snap voltage is either on or off but never reduced. During refresh of the image, the bias is turned off so that mirrors 205 that need to change position can move. The snap voltage of 15V is turned off allowing the mirror 205 to move to flat and be pulled to the opposite position. If the bias is not turned off, the mirror 205 would be stuck even with the 15V off because less voltage is required once the mirror 205 is down.

With the appropriate choice of dimensions (in one embodiment, separation between adjacent mirror plates 205 of 1 to 5 μm depending on mirror structure and deflection angle requirements, and cross-member 215 thickness of 0.05 to 0.45 μm) and materials (such as single crystal silicon <100>), a reflective SLM 100 can be made to have an operating voltage of only a few volts. The shear modulus of the torsion cross-member 215 made of single crystal silicon may be, for example, $5\times10^{10}$ Newtons per meter-squared per radium. The voltage at which the electrode 135 operates to fully deflect the associated mirror plate 205 can be made even lower by maintaining the mirror plate 205 at an appropriate voltage (a "negative bias"), rather than ground. This results in a larger deflection angle for a given voltage applied to an electrode 135. The maximum negative bias voltage is the releasing voltage, so when the addressing voltage reduced to zero the mirror plate 205 can snap back to the undeflected position.

In one embodiment, the total voltage required for pull down is 35 V. In this example, a bias of −20 V needs to get to the mirrors. Then, an on/off actuation voltage of about 15 V is applied to the electrodes below the mirrors. Therefore, the resulting delta is 35 V at on or off.

It is also possible to control the mirror plate 205 deflections in a more "analog" manner. In this example, voltages less than the "snapping voltage" are applied to deflect the mirror plate 205 and control the direction in which the incident light is reflected.

Aside from video displays, the spatial light modulator 100 is also useful in other applications. One such application is in maskless photolithography, where the spatial light modulator 100 directs light to develop deposited photoresist. This removes the need for a mask to correctly develop the photoresist in the desired pattern.

Although the invention has been particularly shown and described with reference to multiple embodiments, it will be understood by persons skilled in the relevant art that various changes in form and details can be made therein without departing from the spirit and scope of the invention. For example, the mirror plates 205 may be deflected through methods other than electrostatic attraction as well. The mirror plates 205 may be deflected using magnetic, thermal, or piezoelectric actuation instead.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of fabricating a mirror structure, the method comprising:
   forming a cavity in a first substrate;
   implanting hydrogen ions in a second substrate;
   bonding the first substrate to the second substrate; and
   separating a portion of the second substrate.

2. The method of claim 1 wherein the first substrate comprises addressing and control circuitry formed using CMOS techniques.

3. The method of claim 1 wherein the cavity is formed in a first side of the first substrate.

4. The method of claim 3 wherein the cavity is etched to a predetermined distance from the first side of the first substrate.

5. The method of claim 4 wherein the predetermined distance is 0.5 to 1.0 μm.

6. The method of claim 1 wherein the second substrate is a single piece of material.

7. The method of claim 6 wherein the single piece of material is single crystal silicon.

8. The method of claim 1 wherein separating a portion of the second substrate comprises cleaving off a carrier wafer portion of the second substrate.

9. The method of claim 1 further comprising depositing a reflective layer to form a mirror plate coupled to the second substrate.

10. A method of fabricating a mirror structure for a micro mirror used in display applications, the method comprising:
   forming a recessed region in a bonding side of a first substrate;
   performing hydrogen doping of a silicon substrate to form a carrier wafer portion of the silicon substrate;
   joining the bonding side of the first substrate to the silicon substrate; and
   separating the carrier wafer portion of the silicon substrate.

11. The method of claim 10 further comprising:
   forming a first metal layer coupled to the silicon substrate;
   depositing a sacrificial layer coupled to the first metal layer;
   patterning a via down to the first metal layer;
   depositing a second metal layer coupled to the sacrificial layer and in the via to form a mirror plate; and
   etching the mirror plate to form the micro mirror.

12. The method of claim 10 wherein separating the carrier wafer portion of the silicon substrate comprises a hydrogen-induced silicon layer cleavage process.

13. The method of claim 12 wherein the hydrogen-induced silicon layer cleavage process comprises a physical process.

14. The method of claim 12 wherein the hydrogen-induced silicon layer cleavage process comprises heating at under 400° C.

15. A micro mirror for a spatial light modulator, the micro mirror comprising:
   a substrate comprising:
      addressing and control circuitry including one or more CMOS cells and operable for receiving actuation signals; and
      a cavity formed in a bonding side of the substrate and operable for providing a motion space during motion of the micro mirror in response to the actuation signals;
   a silicon cross-member coupled to the bonding side of the substrate, wherein the silicon cross-member comprises a cleaved surface; and
   a micro mirror coupled to the cleaved surface of the silicon cross-member and operable for moving in response to the actuation signals.

16. The micro mirror of claim 15 wherein the micro mirror is operable for rotating about an axis of rotation aligned with an axis of the silicon cross-member in response to the actuation signals.

17. The micro mirror of claim 15 further comprising a reflective surface coupled to the micro mirror.

18. The micro mirror of claim 15 wherein the cleaved surface of the silicon cross-member is aligned with a hydrogen ion implantation line.

19. The micro mirror of claim 18 wherein the cavity is recessed to a predetermined depth with respect to the bonding surface of the first substrate.

20. A reflecting structure comprising:
   a first substrate including addressing and control circuitry operable for receiving actuation signals, and a cavity in a bonding side operable for providing a motion space during motion of a micro mirror in response to the actuation signals; and
   a second substrate coupled to the bonding side and including the micro mirror operable for moving in response to the actuation signals, wherein the second substrate comprises a moveable silicon cross-member coupled to the micro mirror.

21. The reflecting structure of claim 20 wherein the reflecting structure comprises a cleaved surface.

22. The reflecting structure of claim 20 wherein the micro mirror comprises a deposited reflecting surface.

23. The reflecting structure of claim 22 wherein the deposited reflecting surface comprises aluminum.

24. The reflecting structure of claim 22 wherein the micro mirror further comprises an adhesive layer underlying the deposited reflecting surface.

25. The reflecting structure of claim 20 wherein the second substrate further comprises a reflecting material beneath the micro mirror.

26. The reflecting structure of claim 25 wherein the reflecting material comprises a metal layer or a multilayer metal stack.

27. The reflecting structure of claim 20 wherein the first and second substrates comprise single crystal silicon.

28. A method of fabricating a reflecting structure comprising:
   forming in a first substrate, addressing and control circuitry operable for receiving actuation signals, and a cavity in a bonding side operable for providing a motion space during motion of a micro mirror in response to the actuation signals;
   bonding a second substrate to the bonding side of the first substrate;
   fabricating a micro mirror on the second substrate operable for moving in response to the actuation signals; and
   forming a moveable silicon cross-member in the second substrate, the micro mirror coupled to the silicon cross-member.

29. The method of claim 28 wherein the second substrate is bonded to the first substrate by contacting a carrier wafer with the first substrate, and then cleaving the carrier wafer along an ion implant line to remove an upper portion of the carrier wafer.

30. The method of claim 29 wherein the cleaving comprises a physical or heat cleave process.

31. The method of claim 29 wherein the cleaving is carried out at a temperature of less than 400° C.

32. The method of claim 28 further comprising implanting hydrogen into the second substrate prior to bonding.

33. The method of claim 28 wherein fabricating the micro mirror comprises depositing a reflecting material over a sacrificial layer, and then removing the sacrificial layer.

* * * * *